Figure 1:
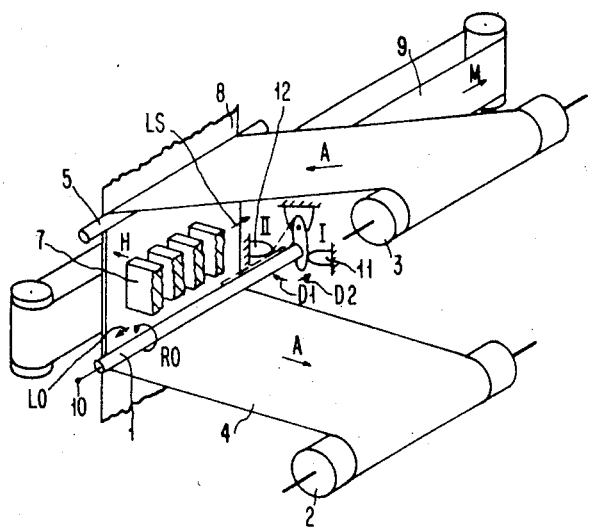

United States Patent [19]

Hilpert

[11] Patent Number: 4,591,283
[45] Date of Patent: May 27, 1986

[54] RIBBON CORRECTION UNIT FOR PRINTERS

[75] Inventor: Fritz Hilpert, Oesterreich, Fed. Rep. of Germany

[73] Assignee: International Business Machines Corporation, Armonk, N.Y.

[21] Appl. No.: 695,602

[22] Filed: Jan. 28, 1985

[30] Foreign Application Priority Data

Feb. 22, 1984 [EP] European Pat. Off. ....... 0841018369

[51] Int. Cl.$^4$ ............................................. B41J 35/04
[52] U.S. Cl. .................... 400/248; 400/248.3; 400/224.2; 226/21
[58] Field of Search .................. 400/248, 224.2, 248.3; 226/18, 19, 21, 22, 23

[56] References Cited

U.S. PATENT DOCUMENTS

| | | | |
|---|---|---|---|
| 3,166,651 | 1/1965 | Leimer et al. | 226/18 |
| 3,322,963 | 5/1967 | Pages | 226/21 |
| 3,435,693 | 4/1969 | Wright | 226/18 |
| 3,533,542 | 10/1970 | Ziebelz et al. | 226/22 |
| 3,608,796 | 9/1971 | Morse et al. | 226/21 |
| 3,776,442 | 12/1973 | Ridley | 226/198 |
| 4,084,683 | 4/1978 | Moss | 400/248 |
| 4,155,496 | 5/1979 | Houck | 226/21 |
| 4,173,929 | 11/1979 | Fisher | 226/21 |
| 4,344,693 | 8/1982 | Hamaker | 226/21 |

FOREIGN PATENT DOCUMENTS

| | | | |
|---|---|---|---|
| 2325661 | 12/1974 | Fed. Rep. of Germany | 400/224.2 |
| 20387 | 2/1982 | Japan | 400/248 |
| 63493 | 4/1983 | Japan | 400/224.2 |
| 81189 | 5/1983 | Japan | 400/224.2 |
| 1414220 | 11/1975 | United Kingdom | 226/21 |
| 417561 | 10/1974 | U.S.S.R. | 226/21 |

OTHER PUBLICATIONS

DeRee et al., "Paper Straightener and Guide" Western Electric Digest, No. 47, p. 5.
Barna "Tape Tracking Guide" IBM Technical Disclosure Bulletin, vol. 11, No. 6, p. 649 11/68.

*Primary Examiner*—William Pieprz
*Attorney, Agent, or Firm*—John S. Gasper

[57] ABSTRACT

For compensating for the lateral displacement of the ribbon (4) during the print operation in impact printers with revolving type carriers (9), an inclined pivotable roller (1) is used which is taken along by contacting the moving ribbon. This roller has a pivot (10) with a free end pivotable between two stops (11,12). If there is no lateral ribbon displacement to be compensated for, the pivotable roller is arrested in its respective current position and thus prevented from rotating. In the event of a ribbon displacement (LS), the pivotable roller rotating about its axis exerts a force component (LO) on the ribbon, counteracting the lateral displacement (LS).

4 Claims, 1 Drawing Figure

RIBBON CORRECTION UNIT FOR PRINTERS

The invention concerns a ribbon correction unit for printers and particularly of the kind having a revolving type carrier.

Ribbon skew may be attributable to the conicity of the rolls receiving the ribbon, to the frequently bar-shaped element reversing the direction of transport not assuming a position parallel to the axes of the rolls, and, above all, to locally different type action imparted to the ribbon producing tensions therein.

It is known (IBM printer 1403) to correct the skew of a ribbon by asymmetrically offsetting (crossing) the axes of the two rolls receiving the ribbon, so that the latter tends to move to one side only. On the other side a sense lever is provided which is cyclically moved into the transport path of the ribbon, indicating whether the lever touches the ribbon or not. By means of a rather elaborate mechanism, this indication is fed to a correcting roller, i.e., as the sense lever touches the ribbon, the correcting roller is forced against the latter. This correcting roller is inclined towards the ribbon's direction of movement such that the ribbon is shifted in a direction opposite to the direction of skew. The inclination of the correcting roller cannot be altered during operation and thus has to be manually adjusted before operation is started. As the correcting action of the inclined correcting roller depends on several factors that may vary, the inclination of the correcting roller must be readjustable. Such readjustment is, of course, highly disadvantageous. Also disadvantageous is the rather elaborate mechanism feeding the data of the sense lever to the device moving the correcting roller upwards and downwards, as a relatively large mass has to be moved that unduly stresses the ribbon edges, so that damage may occur. German Patent No. 19 32 020 concerns a transport mechanism with skew correction for a ribbon, which does not have the shortcomings of the above-described skew correction device and which, unlike the known skew correction device, wherein correction during ribbon transport is possible only in one direction, permits correction in both directions of transport, with the two ribbon rolls, despite the provision of only one electric motor for ribbon transport, the reversal of the direction of transport, and skew correction, being readily accessible for exchange.

This device corrects the skew of a ribbon fully automatically, i.e., even after automatic reversal of the direction of transport, the direction in which the ribbon is corrected is reversed automatically. The design of the device is such that the two ribbon rolls, on their face averted from the printer, are not superimposed by any device components, so that the ribbon rolls are most readily exchangeable. Free accessibility to the ribbon rolls is ensured in that the mechanism for offsetting the axes of the two rolls is driven by the ribbon, so that no power is transmitted from one face of the two rolls, at which the direction of transport is reversed, to the other, at which skew correction is obtained by offsetting the roll axes.

However, the device described in German Patent No. 10 32 020 still has the disadvantage that the ribbon is invariably forced into one of the two directions in which correction is effected. In the direction of type belt movement, correction proceeds rapidly, whereas in the opposite direction it is more time-consuming. The degree of correction varies, as the ribbon is not cylindrically wound on the axes (i.e., in some cases it is wound loosely or tightly and in others it is printed upon only along one edge).

Therefore, it is the object of the invention to provide a ribbon correction unit, wherein the ribbon is corrected according to the respective requirements and independently of mechanical or geometrical characteristics (ribbon winding, axial parallelism, etc.)

This object according to the invention is accomplished by the measures specified in the characterizing part of claim 1.

Advantageous further developments of the invention may be seen from subclaim.

An example of the invention is described in greater detail below with reference to FIG. 1 showing a schematic perspective representation of the ribbon correction unit according to the invention, consisting of a wind-up and a wind-off roll for the ribbon and a unilaterally pivotable roller on which the ribbon moves.

In FIG. 1 the wind-off roll is designated as 3 and the wind-up roll for the ribbon 4 as 2. The print area is positioned between a deflection roller 5 for the ribbon and a control roller 1 which also acts as a deflection roller. In front of the ribbon, the print hammers 7 are arranged in a print hammer bank. The print direction of the hammers is marked by an arrow H. Behind the ribbon, the record carrier 8 and the type carrier (e.g., a steel belt) revolving in the direction M are positioned.

For the sake of simplicity, the axes of rolls 2 and 3 are indicated by a simple line. They are supported in the usual manner, so that further details have been omitted.

The roller 1 can be pivoted in the arrow-marked direction D1 and D2, respectively, at its free end. The pivot positions are designated as I and II respectively. The pivotal motion is effected up to one of the stops 11 and 12.

At its other end, the pivotable roller 1 has its axis, marked by a line, connected to a pivot 10. Such a pivot may be realized in a conventional manner, for example, in the form of a self-aligning bearing. The pivotable roller may be rotatable about its axis by being taken along by the ribbon or it may be non-rotatable by being suitably arrested.

The axes of rolls 2 and 3 extend parallel to each other. The pivotable roller 1 is best arranged at a point adjacent to the print area where the ribbon is reversed. It is at such a point that the pivotable roller is most effective. During its movement, for example, in the arrow-marked direction A, the ribbon is led over the pivotable roller 1, touching the latter and causing same to rotate. This rotation of the pivotable roller may be prevented by external measures. In the latter case, this roller is subsequently referred to as a non-rotatable roller. The axis of the control roller in an assumed position of its free pivotable end between stops 11 and 12 extends roughly parallel to the axes of rolls 2 and 3. By various conventional means, the pivotable roller may be prevented from rotating, using, for instance, a pivot-supported electromagnet which upon excitation moves towards a roller component made of iron, thus preventing said roller from rotating further by magnetic attraction.

As the ribbon moves in the direction marked by arrow A, the pivotable roller 1 (irrespective of whether it is rotating or non-rotating) is pivoted in the direction marked by arrow D2 up to stop 11 to position I. In the non-rotating state of the pivotable roller 1, the ribbon, particularly in the area of the free end of the roller, is flexibly guided on the latter.

Correction is only necessary if the ribbon is laterally deflected in the direction marked by arrow LS. This lateral deflection occurs if a ribbon is used in line printers with revolving type carriers, such as type belts, which are also assumed to move in the direction LS, so that the ribbon is taken along in the latter direction upon actuation of the print hammers. To prevent this lateral deflection or displacement of the ribbon in the direction LS, a counteracting force component by the correction unit according to the invention is provided for. To generate this counteracting force component, the pivotable roller 1 is permitted to rotate freely (if the ribbon is advanced in the, direction A, the pivotable roller performs a rotary motion RO). By inclining the rotating roller, a force component LO, counteracting the displacement LS, is exerted on the ribbon, thus compensating for the displacement LS. If the ribbon is reversed (after its end has been reached), the pivotable mechanism is actuated. Roller 1 is then pivoted from position I to position II towards stop 12. The previous explanations concerning position I analagously apply to position II. If the ribbon does not have to be corrected, the control roller is maintained in its non-rotating state. For the purpose of correction, the pivotable roller rotates, thus generating a force component counteracting the ribbon displacement. Ribbon correction necessitates that the position of the ribbon edge be measured, which may be done by generally known arrangements, such as a photocell arrangement, which need not be described in detail.

The correction unit according to the invention has a simple design and a correction mechanism responding quickly.

These advantages cannot be obtained by prior art arrangements for the following reasons:

Sensing triggers the mechanism for pivoting the axes. The ribbon bias thus produced has to be eliminated for correction; the time required for this purpose depends on the ribbon winding.

The invention furthermore permits the use of ribbon cartridges, which cannot be used in prior art arrangements, as the axes of ribbon cartridges are stationary.

With the non-rotating pivotable roller 1 there is no correction. Correction is effected only as long as this roller is rotating. This kind of correction has the advantage of being instantly effective and of being independent of the ribbon winding.

Correction is invariably effected in the desired direction opposite to the direction of movement of the revolving type carrier. If the pressure is low, only few corrections are necessary. Stress to which the ribbon is subjected when moving across the inclined pivotable roller is compensated for by its elasticity.

We claim:

1. A ribbon correction unit for impact printers with type carriers revolving transversely to the direction of ribbon advance, comprising a wind-up and wind-off roll for a ribbon, characterized in that the ribbon is guided across at least one pivotable guide roller located between sid wind-up and wind-off rolls, said guide roller being pivotable about a pivot between two stops, said pivotable guide roller being arranged such that its axis extends roughly parallel to the direction of revolution of the type carrier and its free pivotable end points in the direction of said transverse revolution of said type carrier, said pivotable guide roller by contact with the ribbon is pivoted in the direction of ribbon advance up to said stops, said pivotable guide roller being freely rotatable as a result of contacting said moving ribbon, and means for preventing or allowing the free rotation of said guide roller while in contact with said moving ribbon, said means being selectively operable during printing for compensating for a lateral displacement of the ribbon, occurring during printing in the direction of revolution of the type cartrier, for allowing rotation of said pivotable guide roller whereby said guide roller exerts a force component on the ribbon counteracting said lateral displacement.

2. A ribbon correction unit according to claim 1, characterized in that said pivotable guide roller, is a deflection roller positioned adjacent to the print area.

3. A ribbon correction unit according to claim 1, characterized in that said means for preventing or allowing rotation of said guide roller is an electromagnetic means including means to engage said guide roller to prevent rotation, said electromagnetic means being operable during printing to allow rotation of said guide roller for compensating for lateral displacement of said ribbon.

4. A ribbon correction unit according to claim 1, characterized in that said guide roller includes a component portion made of iron, and said means for preventing or allowing free rotation of said guide roller includes electromagnet means for preventing rotation by magnetic attraction with said component portion.

* * * * *